United States Patent Office 3,247,139
Patented Apr. 19, 1966

3,247,139
INTERPOLYMERS OF ETHERIFIED ALDEHYDE-MODIFIED CARBOXYLIC ACID AMIDES
Roger M. Christenson, Gibsonia, Richland Township, and Donald P. Hart, Allison Park, McCandless Township, Allegheny County, Pa., assignors to Pittsburgh Plate Glass Company, Pittsburgh, Pa., a corporation of Pennsylvania
No Drawing. Filed Jan. 2, 1962, Ser. No. 163,913
27 Claims. (Cl. 260—21)

This application is a continuation-in-part of copending application Serial No. 775,380 filed November 21, 1958.

This invention relates to a novel and useful class of polymeric products, and particularly to the preparation of interpolymers of etherified aldehyde-modified carboxylic acid amides in an aqueous solution, and to the products prepared thereby.

This invention further relates to the preparation in an aqueous medium of etherified aldehyde-modified carboxylic acid amide interpolymers in a medium containing an adduct of an unsaturated fatty ester and a dicarboxylic acid or anhydride.

In a copending application, Serial No. 749,583, filed July 21, 1958, now United States Patent No. 3,037,963 it is disclosed that very useful resinous materials can be prepared by reacting an aldehyde, and particularly formaldehyde, with an interpolymer of an unsaturated amide and at least one other monomer containing a $CH_2=C<$ group. The resinous products obtained in this manner are particularly useful, either alone or in combination with other resinous materials, in the preparation of coating compositions, films of which exhibit outstanding gloss, durability, and chemical resistance.

In the above-mentioned copending application, Serial No. 749,583, preparation procedures involve solution polymerization in an organic solvent medium. In many instances, however, the polymers which have been prepared in the solution medium cannot be utilized for certain applications.

It is advantageous to have a water-base system for various reasons; for example, they are not flammable and an aqueous medium is the least toxic. In certain industrial applications expediency or tradition dictates that aqueous mediums be used and it is therefore an advantage to obtain the newly prepared polymer in an aqueous medium rather than in a non-aqueous medium.

The preparation of the said aldehyde-modified unsaturated carboxylic acid amide interpolymers can be carried out in an emulsion medium in order to prepare a water base system. However, there are several deficiencies which are inherent in most emulsions. For example, emulsions are of limited use in many areas where solution polymerized polymeric compositions can be used. Since emulsions by their very nature are heterogeneous in structure they form films and coatings from the aggregate of discrete particles dispersed therein and therefore do not ordinarily have good film integrity. Moreover, the emulsifier for surface activation which is used in emulsion polymerizations is not generally a film-forming material and its presence is undesirable because of the water sensitivity which it tends to impart to the coating composition. Emulsions are characteristically poor in pigment wetting and rarely provide a composition which will have high gloss when deposited as a pigmented film.

It has now been discovered that useful water soluble resins can be prepared by the copolymerization of a mixture of monomers containing from about 5 percent to about 30 percent and preferably 7.5 percent to about 18 percent by weight of the total monomer solids of an unsaturated carboxylic acid, and subsequently forming the water soluble salt of the resulting polymer. When compositions thus prepared are applied to a surface by any one of the well-known techniques and subsequently cured, they produce films which have properties substantially identical to those which have been applied from the standard organic solution compositions.

The water soluble interpolymer compositions of the instant invention have substantially all of the advantages of an emulsion but none of the disadvantages. They may be alternately subjected to freezing and thawing without any apparent change in properties. Moreover, they exist as a continuous solution rather than a heterogeneous dispersion. Additionally, the solution compositions of the instant invention do not require the presence of an emulsifier. Like the organic solution polymer compositions they have very good pigment wetting and produce pigmented films having excellent gloss and hiding power.

The aqueous solutions of the interpolymer compositions of the instant invention may be prepared in a variety of ways. Since the aldehyde modification of the amide groups of the interpolymer is very difficult in the presence of water, it is advantageous to first methylolate and etherify the carboxylic acid amide monomer in the presence of an alcohol, preferably an alcohol having at least 4 carbon atoms, and subsequently to polymerize the monomeric etherified methylolated carboxylic acid amide with the other desired comonomers. They may be emulsified with a surface active agent by a well-known emulsion polymerization procedure and subsequently made soluble through the formation of their salt by adding ammonia or a suitable amine compound.

As an alternative procedure, the interpolymer may be prepared in a water soluble solvent, reacted with a basic material to form its water soluble salt and subsequently dissolved with the other ingredients in a suitable amount of water. As a variation of the above-mentioned emulsion procedure, an aqueous dispersion of the unsaturated carboxylic acid amide interpolymers may be prepared without the need for a surface active agent by simultaneously adding an individual solution of the monomers and an individual solution of the catalyst to a reactor containing an aqueous solution of the catalyst. Both of the solutions are added rather slowly while the reaction mass is kept under constant agitation. After all of the ingredients have been added and the polymerization has run its course, a basic salt forming material is added to the reactor until a pH of at least about 7 is obtained.

As mentioned above, it is preferred that the unsaturated carboxylic acid amide monomer be treated with an aldehyde and etherified with an alcohol prior to interpolymerization because many of the unsaturated carboxylic acid amides do not readily lend themselves to polymerization techniques in aqueous mediums since they are for the most part water soluble and relatively insoluble in the other vinyl monomers. Moreover, the presence of water affects the methylolation and etherification to an extent which makes the procedure extremely inefficient. Acrylamide, which is the preferred unsaturated carboxylic acid amide, is water soluble and fails significantly to interpolymerize with the other comonomers, resulting in a product having mostly homopolymeric acrylamide and very little interpolymer.

In copending application Serial No. 775,380 filed November 21, 1958, now United States Patent No. 3,079,434, there is disclosed a process for the preparation of the etherified methylolated derivatives of acrylamide of the general structure:

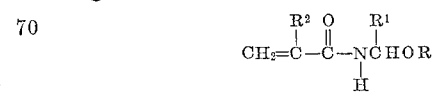

wherein R is a member of the group consisting of an alkyl group having from about 1 to 18 carbon atoms and a cycloalkyl group having from about 3 to 7 carbon atoms, $R^1$ is a member of the group consisting of hydrogen and a saturated lower aliphatic hydrocarbon radical, and $R^2$ is a member selected from the group consisting of hydrogen and a methyl radical.

The preparation of the N-alkoxymethyl substituted unsaturated amides is accomplished by reacting an unsaturated amide such as acrylamide with formaldehyde and an alkanol under acidic conditions, and in the presence of a polymerization inhibitor.

The formaldehyde employed in the reaction may be in several forms; for example, polymers of formaldehyde such as paraformaldehyde or trioxymethylene may be used. It is also possible, and in fact very convenient, to utilize a solution of formaldehyde in the alkanol utilized to form the alkoxy portion of the desired product. Solutions of formaldehyde in alcohols are known commercially as "Formcels." For example, the product known as butyl Formcel contains approximately 40 percent formaldehyde, 51 percent butyl alcohol, and 8.5 percent water.

Any alkanol of the structure ROH, wherein R is an alkyl radical, can be reacted with the unsaturated amide and formaldehyde to produce N-alkoxymethyl substituted unsaturated amides. For example, such alcohols include methyl alcohol, ethyl alcohol, propyl alcohol, isopropyl alcohol, butyl alcohol, isobutyl alcohol, amyl alcohol, octyl alcohol, decyl alcohol, octadecyl alcohol, allyl alcohol, and the like. Preferably, however, an alcohol having at least four carbon atoms is employed, particularly butyl alcohol.

As indicated hereinabove, the reaction of the unsaturated amide, formaldehyde, and the alcohol is carried out under acidic conditions. Preferably, the degree of acidity is such that the reaction mixture has a pH of about 3.0 to 6.0 during the major part of the reaction. Ordinarily, no additional acid need be added since the alcohol-formaldehyde solution is sufficiently acidic to bring the pH within the desired 3.0 to 6.0 range. However, mineral acids such as sulfuric acid, phosphoric acid, hydrochloric acid, and the like may be added, as may organic acids such as oxalic acid, citric acid, or tartaric acid, and the like.

In order to prevent polymerization of the unsaturated amide reactant and/or the polymerizable product, and thus insure highest possible yields of the desired product, it is important that a polymerization inhibitor be present in the reaction mixture. Commercially available polymerizable amides such as acrylamide and methacrylamide may contain such inhibitors; however, it is generally desirable to add additional inhibitors prior to or during the course of the reaction. A particularly useful class of inhibitors for this purpose includes the quaternary ammonium salts such as the following compounds:

Trimethylbenzyl ammonium acetate
Trimethylbenzyl ammonium chloride
Trimethylbenzyl ammonium bromide
Triethylbenzyl ammonium chloride
Tripropylbenzyl ammonium chloride
Tributylbenzyl ammonium chloride
Cetyl trimethyl ammonium chloride
Octadecyl trimethyl ammonium chloride
Trimethylbenzyl ammonium sulfate
Lauryl pyridinium chloride
Phenyl trimethyl ammonium chloride
Tolyl trimethyl ammonium chloride
Benzyl trimethyl ammonium phosphate
Benzyl trimethyl ammonium iodide
Ethyl pyridinium chloride
Phenyl trimethyl ammonium chloride
Phenyl trimethyl ammonium bromide
Octyl trimethyl ammonium chloride
Ethylene bis(pyridinium chloride)
Ethylene bis(trimethyl ammonium bromide)
Trimethylbenzyl ammonium oxalate
Trimethylbenzyl ammonium malate
Trimethylbenzyl ammonium tartrate
Trimethylbenzyl ammonium lactate Other polymerization inhibitors such as hydroquinone, pyrogallol, the monomethyl ether of hydroquinone, tertiary butyl catechol, 2,5-ditertiary butyl hydroquinone, and the like may also be employed with good results. Amines such as N,N'-diphenylphenylene diamine and para-hydroxy diphenylamine can also be utilized.

In carrying out the reaction described hereinabove, a typical procedure involves dissolving the unsaturated amide in the alcohol and adding the resulting solution to a solution of the alcohol and formaldehyde, the latter solution including at least a part of the polymerization inhibitor. The resulting mixture is then refluxed, and after the reaction is substantially complete, the reaction mixture is washed with water, the alcohol is removed by distillation, as is the dialkyl formal by-product which is formed. The residue is a homogeneous liquid, which is almost entirely the desired N-alkoxymethyl unsaturated amide.

Alternative methods of processing include removal of the water by azeotropic distillation, or dispensing with the water washing followed by removal of the alcohol and dialkyl formal by distillation. If any solid precipitates in this procedure it is removed by filtration.

The formaldehyde is ordinarily added in excess to promote as rapid and complete a conversion of the amide to the methylol or alkoxymethyl derivative as possible and minimize the formation of the methylene bis-unsaturated amide. Some formaldehyde is also consumed by the formation of a dialkyl formal.

The alcohol is also generally added in excess to promote the formation of N-alkoxymethyl substituted unsaturated amides and to minimize side reactions. The pH of the reaction is preferably increased toward the acid side as the reaction proceeds in order to first secure reaction of the unsaturated amide without formation of methylene bis-unsaturated amide, and later to force the alkylation of the N-methylol acrylamide to completion.

In accordance with the instant invention at least 5 percent by weight of the interpolymer is an unsaturated carboxylic acid, preferably acrylic and methacrylic acid. While there is actually no absolute limit on the maximum amount of acid which can be employed to provide salt forming characteristics for the unsaturated carboxylic acid interpolymer, amounts greater than about 30 percent tend to impart water sensitivity to an abnormal degree. Other acids which may be employed include maleic acid, fumaric acid, itaconic acid, crotonic acid, angelic acid, tiglic acid and the like.

In order to promote the polymerization to obtain the interpolymers of the instant invention any one of the well-known free radical initiating catalysts may be employed. These include the well-known peroxygen catalysts such as benzoyl peroxide, hydroxyheptyl peroxide, methylethyl ketone peroxide, cyclohexanone peroxide, cyclohexyl hydroperoxide, 2,4-dichlorobenzoyl peroxide, cumene hydroperoxide, t-butyl hydroxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It is preferable that the water soluble catalysts be used such as hydrogen peroxide, ammonium persulfate, potassium persulfate and other similar persulfates. The polymerization proceeds at temperatures in the range of from 50° C. to about 95° C. and most efficiently at temperatures of 80° C. It is therefore desirable to choose a catalyst which is preferred for this temperature such as the persulfate. In addition the redox catalyst systems may be employed, such as an ammonium persulfate-potassium bisulfite mixture wherein the ammonium persulfate is present in amounts ranging from 8 to 12 times the potassium bisulfite. The catalyst system is employed in amounts ranging from about 0.1 to about 5 percent by weight of the total monomer solids and preferably in amounts of about 0.5 to 1.5 percent.

If the emulsion route is taken to prepare the interpolymer compositions of the instant invention, a surface active agent should be employed. The anionic types are preferred.

Surface active agents which may be employed include glycerol monooleates and laurates and also salts of fatty alcohol sulfates (Duponol ME), dioctyl ester of sodium sulphosuccinic acid (Aerosol OT), polyethylene oxide condensation product (Emulphor AG), sodium salts of a fatty acid amide of taurine (Igepon), sodium salts of alkyl aryl polyether sulfate (Triton 770), a sodium salt of a sulfate ester of an alkyl phenoxy polyoxyethylene ethanol (Alipal CO-433), and the like. Cationic emulsifying agents such as lauryl pyridinium chloride, cetyl-dimethylbenzyl chloride (Triton K-60), benzyl trimethyl ammonium chloride, and the like, may also be used.

It is desirable that the interpolymer contain in polymerized form from about 2 percent to about 50 percent of the said etherified aldehyde-modified carboxylic acid amide as defined by Formula I. The remainder of the interpolymer may be made up with one or more of the $CH_2=C<$ monomers set forth below.

(1) Monolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4 - dimethyl - hexene - 1, 2,5-dimethyl - hexene - 1, 2-methyl-3-ethyl-pentene-1, 2,3,3-trimethyl-pentene-1, 2,3,4 - trimethyl - pentene - 1, 2,4,4-trimethyl-pentene-1, 2-methyl-octene-1, 2,6-dimethyl-heptene-1, 2,6 - dimethyl - octene - 1, 2,3-dimethyl-decene-1, 2-methyl-nonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,3-tetrachloroethylene, 1-chloro-2,2,2-trichloroethylene, chlorobutadiene, and other halogenated diolefinic compounds;

(3) Esters of organic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate, and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate, and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethylpropyl)-1-butene-4-ol, and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate, and diethyl glutaconate;

(4) Organic nitriles, such as acrylonitrile, methacrylonitrile, ethacrylonitrile, 3-octenenitrile, crotonitrile, oleonitrile, and the like;

In order to solubilize the acid containing interpolymers of the instant invention, it is preferred that ammonia or a suitable amine compound be employed. The salts prepared using these types of compounds form gaseous products during a subsequent curing of the compositions and therefore do not leave an undesirable residue in the resulting film which may affect the color or other physical properties such as water resistance of the films.

Among the amines which may be utilized are the primary, secondary, and tertiary amines which form water soluble salts such as methylamine, ethylamine, propylamine, dimethylamine, diethylamine, dipropylamine, dihexylamine, trimethylamine, triethylamine, tripropylamine, tributylamine, trihexylamine, monoethanolamine, monobutanolamine, dibutanolamine, dimethylethanolamine, triethanolamine, tributanolamine, and the like.

The quarternary ammonium hydroxides which may be employed include trimethylbenzyl ammonium hydroxide, triethylbenzyl ammonium hydroxide, trimethyllauryl ammonium hydroxide, triethyllauryl ammonium hydroxide, tributyllauryl ammonium hydroxide, and the like. For obvious reasons of economy, availability, and ease of handling, ammonium hydroxide is the preferred salt forming agent.

The polymers may be isolated as their salts by well-known spray-drying techniques and stored as 100 percent solids products.

The following examples are given by way of illustration and not by way of limitation. All parts and percentages are by weight unless otherwise specified.

EXAMPLE I

The following materials were emulsified in a glass reactor:

| | Parts by weight |
|---|---|
| Water | 80.00 |
| Sodium-N-methyl-N-oleoyl taurate (70 percent active) | 3.00 |
| Ethyl acrylate | 35.12 |
| Methyl methacrylate | 31.45 |
| N-butoxymethyl acrylamide | 25.53 |
| Methacrylic acid | 7.50 |
| Tertiary dodecyl mercaptan | 4.00 |
| Ammonium persulfate | [1] 0.50 |

[1] In 2.5 parts water.

Ten (10) parts by weight of the above emulsion and 67.5 parts of water were mixed in a glass polymerization reactor and heated to a temperature of 90° C. The remaining emulsion was then added slowly over a 3-hour period with the temperature being maintained at 90° C. during the addition, and for a period of 1½ hours thereafter. The mixture was then cooled to 50° C. and 68 parts by weight of water and 3.5 parts by weight of 28 percent ammonium hydroxide added thereto.

The polymer thus produced had a solids content of 30 percent, a viscosity of 5000 cps., a pH of 7.5 to 8.5, and was water soluble. Films of the water soluble polymer drawn down on glass plates and baked were hard and clear, and resistant to the reaction of solvents and other chemicals.

EXAMPLE II

| | Parts by weight |
|---|---|
| Solution A: | |
| Water | 1000 |
| Sodium persulfate | 8 |
| Solution B: | |
| Ethyl acrylate | 352 |
| Methyl methacrylate | 314 |
| N-butoxymethyl acrylamide | 259 |
| Methacrylic acid | 75 |
| Tertiary dodecyl mercaptan | 20 |
| Solution C: | |
| Water | 2000 |
| Sodium persulfate | 2 |

Solution C was added to a reactor equipped with stirrer, condenser and thermometer and heated to a temperature between 85° C. and 88° C. Solution A and Solution B were then simultaneously added dropwise to the reaction vessel over a period of 2½ hours during which time the temperature was maintained between 85° C. and 88° C. under continuous agitation. After the addition was complete the reaction mass was maintained for an additional hour at a temperature between 85° C. and 88° C. The reaction mass was then cooled to a temperature of below 50° C. and adjusted to a pH of at least 8. The resulting clear solution had a viscosity of 500 cps. (Brookfield viscometer).

EXAMPLE III

| | Parts by weight |
|---|---|
| Methacrylic acid | 8.0 |
| N-butoxymethyl acrylamide | 19.0 |
| Methyl methacrylate | 34.4 |
| Ethyl acrylate | 37.8 |
| Tertiary dodecyl mercaptan | 4.0 |
| Benzoyl peroxide | 1.0 |

The above ingredients were added dropwise to a suitable vessel containing 10 parts ethyl alcohol over a 4-hour period, continuous reflux being maintained. One hour subsequent to the completion of the addition .5 part of benzoyl peroxide was added to the reaction mass. The reaction was continued at reflux for an additional 2 hours and cooled to about 60° C. A solution containing 120 parts of water and 10 parts of a 28 percent ammonium hydroxide solution was then added to the reaction mass, whereupon a clear solution was obtained, giving 35.5 percent solids, a pH of 8.8 and a viscosity of 4800 cps. The resulting composition was drawn down on phosphatized steel panels (Bonderite 100) and cured at 350° F. for 30 minutes.

EXAMPLE IV

| | Parts by weight |
|---|---|
| Solution A: | |
| Ethyl acrylate | 35.3 |
| Methyl methacrylate | 31.3 |
| N-butoxymethyl acrylamide | 25.9 |
| Tertiary dodecyl mercaptan | 3.3 |
| Methacrylic acid | 7.5 |
| Solution B: | |
| Emulsifier (Igepon T-77) | 3.0 |
| Water | 100.0 |
| Ammonium persulfate | 0.5 |

Solutions A and B were individually added simultaneously over a 3-hour period to a suitable vessel containing 100 parts of water which was maintained at a temperature between 88° C. and 90° C. The temperature of the reaction mass was then maintained for an additional 1½ hours and cooled to 50° C. Five and five-tenths (5.5) parts of a 28 percent solution of ammonium hydroxide were then added thereto. The resulting resinous solution had the following properties:

| | |
|---|---|
| Solids (percent) | 30–32 |
| Viscosity (Brookfield viscometer) cps. | 1000 |
| pH | 7.5–8.0 |

As a further refinement of the instant invention, it has been found that significant advantages are obtained when a salt, preferably an ammonia or an amine salt of an adduct of a dicarboxylic acid or anhydride and an unsaturated fatty ester is substituted for the surface active agent or the emulsifier in carrying out the polymerizations of the instant invention. It has been proposed in U.S. Patent 2,941,968 to polymerize styrene and thermoplastic copolymers thereof in the presence of adducts of this general type. The interpolymers of the instant invention, however, are cross-linkable due to the presence of the methylolated amide group, whereas the resinous compositions set forth in U.S. Patent 2,941,968 can cross-link only by way of oxidation of the adducts. The aqueous compositions prepared using the said adducts have proved to be extremely stable and manifest all the properties of the resinous compositions which were prepared as a solution rather than as an emulsion. This is especially true when the adduct of the dicarboxylic acid or anhydride and the unsaturated fatty ester is present in amounts of at least about 20 percent by weight of the total solids content.

Another and important advantage which is obtained through the use of the said adducts is that a surface active agent or an amulsifier is not necessary and therefore there is no problem with water sensitivity of the cured resinous compositions; the adducts themselves become an integral and water resistant part of the cured resins by forming an interpolymer with the etherified amides. While the exact mechanism by which the interpolymers are formed is uncertain, one possible explanation is that the vinyl polymerized chain is terminated and bonded to an alpha methylene group of the drying oil residue of the adducts.

In preparing the adduct of the dicarboxylic acid or anhydride and the unsaturated fatty ester, it is desirable that from about 14 percent to 45 percent by weight of the unsaturated acid anhydride be reacted with from about 55 percent to 86 percent by weight of the unsaturated fatty ester.

If less than 14 percent by weight of the unsaturated acid or anhydride is employed, the adducts will be only partially water soluble unless water soluble organic solvents are employed to give water solubility. If more than 45 percent of acid is utilized, films of the adduct may be deficient in water resistance.

A second requirement for the adduct is that it form a solution in water at a pH of 7.5 without the use of water soluble organic solvents such as alkylene glycol monoalkyl ethers which are often used to produce aqueous solutions of maleic fatty ester adducts. In order to obtain such clear solutions at a pH of 7.5 without the use of solvents, it is necessary that the amount of alkaline materials employed to neutralize the adduct be such that substantially complete neutralization is achieved; that is, enough alkaline material should be employed to neutralize at least 50 percent of the acidity of the adduct. If less neutralization is obtained, a cloudy solution will result when the resin is added to water. Such resins will not have the stability and homogeneity necessary to give the excellent properties possessed by the compositions which are at least 50 percent neutralized.

A third requirement for the adduct is that it form a water insensitive film when baked at 350° F. for 30 minutes. By water insensitive film is meant a film which will not soften and begin to dissolve when immersed in water.

As indicated hereinabove, unsaturated fatty esters with which the unsaturated dicarboxylic acid anhydrides or anhydride-forming acids are reacted to form adducts which in turn can be neutralized to form useful water soluble resins are the simple esters such as the drying oils and semi-drying oils or the more complex esters such as the long oil alkyds, epoxy esters, fatty acid esters of hydroxyl substituted polymers; also included are the simple and complex esters of carboxylic acids where the unsaturation is in the alcohol residue. Generally, the drying oils are those oils which have an iodine value above about 130, and the semi-drying oils are those which have an iodine value of about 90 to 130 as determined by method ASTM-D 1467–57T. Included among these oils are linseed oil, soya oil, safflower oil, perilla oil, tung oil, oiticica oil, poppyseed oil, sunflower oil, tall oil, walnut oil, dehydrated castor oil, herring oil, menhaden oil, sardine oil, and the like. Also included among such oils are those in which the oils per se are modified with other acids such as phthalic acid (or anhydride) or benzoic acid by first forming a di- or monoglyceride or a mixture thereof by alcoholysis, followed by esterification. Polyols other than glycerol can also be employed in the alcoholysis. Modification of the oils with cyclopentadiene, styrene, or other monomers can also be used. Other esters of unsaturated fatty acids, for example, those prepared by the esterification of tall oil fatty acids with polyols, are also useful. Examples of complex unsaturated fatty esters include the reaction products of polyhydroxy containing polymers such as Shell X–450 and Monsanto's RJ–100 with unsaturated fatty acids, epoxy esters prepared from reaction products of epoxy resins such as Shell's Epon series with the unsaturated fatty acids and the decarboxylated unsaturated fatty acid mixtures such as the Trokenes. In addition, unsaturated fatty esters such as long oil alkyds having a low hydroxyl value (greater than 70 percent oil length) using the oils mentioned above are also useful. All of these materials can be reacted with unsaturated dicarboxylic acid anhydrides to give adducts useful in preparing the compositions of this invention.

The unsaturated dicarboxylic acid anhydride utilized in forming the adduct is an alpha,beta-ethylenically unsaturated dicarboxylic acid anhydride, such as maleic anhydride, itaconic anhydride and others. Instead of the anhydride, it is also possible to utilize ethylenically unsaturated dicarboxylic acids which form anhydrides, for example, maleic acid or itaconic acid. These acids probably function by first forming the anhydride. Fumaric acid, which does not form an anhydride, may also be utilized, although with considerably more difficulty than the unsaturated dicarboxylic acid anhydrides or the unsaturated dicarboxylic acids which form anhydrides. Mixtures of the acids and anhydrides may also be utilized. Ordinarily the anhydride employed should contain from 4 to about 12 carbon atoms, although longer chain compounds can also be employed if desired.

The reaction with non-conjugated oils to form the adduct probably does not take place according to a true Diels-Alder type reaction in which conjugated double bonds must be present, but instead is believed to represent the reaction of an anhydride or acid with the methylene group adjacent to a non-conjugated double bond such as is present in linseed oil. This reaction may be represented as follows, wherein maleic anhydride is utilized for illustrative purposes:

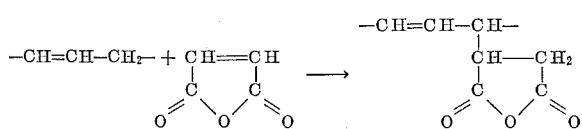

When conjugated oils such as tung oil are utilized, the reaction is probably of the Diels-Alder type.

The above reactions take place readily without the use of catalyst and at temperatures in the range of about 100° C. to 300° C. or more, with most of the reaction occurring in the range of about 200° C. to 250° C. The reaction is ordinarily complete in less than three hours. The adduct obtained is insoluble in water.

The acidity of this adduct is then at least 50 percent neutralized with ammonia or a water soluble amine or a quaternary ammonium hydroxide.

Preferably, the pH of the neutralized and solubilized adduct should be maintained in the range of 7.5 to 9.0. If the pH is substantially lower than 7.5, the viscosity will be increased to the point that the material may be too viscous for practical use at a reasonable solids content, and if below 7.0 an unstable resin may result. However, it is an advantage of the materials described herein that the viscosity can readily be maintained within the desired range simply by adjustment of the pH to bring it within the 7.5 to 9.0 range.

It has also been found advantageous, although not essential, to add to the neutralized and solubilized adduct a small amount of an amino-alkyl-alkanediol such as 2 - methyl-2-amino-1,3-propanediol, 2-ethyl-2-amino-1,3-propanediol, 2-methyl-2-amino-1,4-butanediol, or the like. While the diol obviously has some neutralizing effect, it has been found that it also produces a film with considerably increased hardness and improved water resistance, even though only small amounts are added. For example, optimum efficiency is achieved when only 4 percent by weight of the resinous component is used. Larger amounts have little or no effect on the properties of the film, whereas the water resistance appears to fall off slightly when amounts of less than about 4 percent are employed.

The following examples illustrate the preparation of the solubilized oil-anhydride adducts and the emulsion and polymerization of the N-alkoxymethyl acrylamides in their presence. The examples are not intended to limit the invention, however, for there are obviously many possible variations and modifications. All parts and percentages are by weight unless otherwise specified.

EXAMPLE V

Thirty and four-tenths (30.4) parts (76 percent) of linseed oil and 9.6 parts (24 percent) of maleic anhydride were placed in a reactor and heated to a temperature of 375° F. The heat was then turned off and since the reaction is strongly exothermic, the temperature rose to between 475° F. and 500° F. After approximately 2½ hours, the reaction mixture was added with stirring to a mixture of 10.5 parts of 28 percent aqueous ammonium hydroxide and 1.88 parts of 2-methyl-2-amino-1,3-propanediol and 49.5 parts of water. The composition had a U-X viscosity on the Gardner-Holdt scale and a solids content of 43 percent. The Gardner color was 14–16 and the weight per gallon 8.7 pounds. The pH of the composition was 8.5. The resinous compositon was then adjusted to a solids content of 40 percent with water.

EXAMPLE VI

A series of oil-anhydride adducts was prepared utilizing varying ratios of anhydride to oil. The reaction was carried out by heating the reaction mixture to 100° C., and then gradually allowing the temperature to increase to 250° C., where it was maintained for about 15 minutes. The reaction mixture was then allowed to cool and portions thereof neutralized with ammonium hydroxide, and in some instances with mixtures of ammonium hydroxide and 2-amino-2-methyl-1,3-propanediol. Water was added to give a desired viscosity and solids content. The pertinent data are set forth in Table I.

EXAMPLE VII

Example VI is repeated substituting maleic acid and itaconic acid respectively for the maleic anhydride. In each case a resin substantially equivalent to maleic anhydride product was obtained. Similar results are achieved when a mixture of maleic acid and maleic anhydride or a mixture of maleic anhydride and itaconic acid are utilized. Water is given off during the reaction of the acids with the oil, indicating that an anhydride forms.

The above composition was drawn down on glass and baked at 350° F. for 30 minutes. The film was alkali and water resistant with good gloss and flexibility.

EXAMPLE X

Solution A: Parts by weight
Styrene _____ 495.0
N-butoxymethyl acrylamide _____ 55.0

Solution B:
Product of Example V _____ 312.5
Water _____ 550.0
Ammonium persulfate _____ 5.0
Potassium bisulfite _____ 0.5

Solution B was mixed with 500 parts of Solution A and added to a suitable vessel. The reaction mixture was maintained at a temperature falling within the range of 88° C. to 90° C. for 2 hours, after which was added a solution comprising 2.5 parts of ammonium persulfate and 25 parts of water. The reaction mixture was maintained at the same temperature for 2 hours more and another addition of ammonium persulfate in water was

*Table I*

| Oil | Anhydride | Ratio oil/anhydride (percent) | Resin neutralized (parts by weight) | 28 percent ammonium hydroxide utilized (parts by weight) | 2-methyl-2-amino-1,3-propanediol (parts by) | Water added (parts by weight) | Resin solids | Gardner-viscosity viscosity | pH |
|---|---|---|---|---|---|---|---|---|---|
| Linseed | Maleic anhydride | 82.8/17.2 | 2,000 | 496 | | 1,504 | 48.1 | W | 9.1 |
| Do | do | 76/24 | 2,711 | 525 | 120 | 3,176 | 44.2 | U-X | 7.7 |
| Do | do | 67/33 | 1,200 | 446 | | 1,452 | 42.7 | V | 8.1 |
| Soya | do | 76/24 | 768 | 125 | 36 | 936 | 42.5 | $Z_1$-$Z_2$ | 7.7 |
| Tall oil fatty acids—Trimethylol ethane ester | do | 76/24 | 704 | 135 | | 761 | 44.0 | $Z_6$ | 8.0 |
| Benzoic acid modified linseed | do | 79/21 | 3,000 | 400 | 139 | 3,678 | 41.0 | $Z_1$ | 8.0 |

The following examples relate to the preparation of the interpolymers of the instant invention in the presence of an adduct of a dicarboxylic acid anhydride and a drying oil.

EXAMPLE VIII

Parts by weight
Product of Example V _____ 500
Water _____ 200
N-butoxymethyl acrylamide _____ 40
Butadiene _____ 160
Potassium persulfate _____ 2
Ammonium hydroxide (28 percent solution) _____ 4

The above ingredients were charged into a bomb and heated at 78° C. for 16 hours. The resulting semi-transparent product had the following properties:

Solids (percent) _____ 41.25
pH _____ 7.00

EXAMPLE IX

Parts by weight
Product of Example V _____ 500
Styrene _____ 144
N-butoxymethyl acrylamide _____ 56
Water _____ 100
Ammonium persulfate _____ 2
Sodium salt of lauryl ether sulfate (Sipon ES) ____ 4
Ammonium hydroxide (28 percent solution) _____ 2

The above ingredients were emulsified and added dropwise over a 2-hour period to a suitable vessel containing 150 parts of water at 85° C. The reaction mass was maintained at a temperature range between 87° C. and 92° C. for 2 hours. The reaction mass was then cooled and filtered. The resinous product had the following properties:

pH _____ 8.2
Solids (percent) _____ 41.6
Viscosity (Brookfield viscometer), cps. _____ 28 made. The reaction mass was then maintained at the same temperature for two more hours to completion. The resinuous product had the following properties:

pH _____ 7.3
Solids (percent) _____ 46.5

EXAMPLE XI

The following example relates to the preparation of a long oil alkyd.

Parts by weight
Linseed oil _____ 2550.0
Trimethylol ethane _____ 159.0
Litharge (PbO) _____ 1.5
Phthalic anhydride _____ 209.0
Benzoic acid _____ 126.0
Xylene _____ 60.0

The linseed oil and trimethylol ethane were heated in a vessel equipped with thermometer, stirrer and condenser for 47 minutes to 392° F. and the litharge was added to the vessel. The reaction mixture was then heated to 460° F. and held for 1 hour, cooled to 440° F. and the phthalic anhydride and the benzoic acid were added with the xylene. The reaction mixture was then refluxed at 580° F. for 3 hours more. The resulting resinous composition had the following properties:

Solids (percent) _____ 97.8
Viscosity (Gardner-Holdt) _____ D
Acid No. _____ 13.95
Density (wt./gal., lbs.) _____ 7.92
Color (Gardner) _____ 10+

One thousand and eight hundred parts of the above composition was mixed in a vessel with 150 parts of maleic anhydride at a temperature of 400° F. After 19 minutes the reaction temperature rose to 408° F. and 150 parts more of maleic anhydride were added to the vessel. After 24 minutes a third and last addition of 150 parts of maleic anhydride was made, the reaction temperature being 404° F. The reaction temperature was gradually raised to 460° F. over a 52 minute period. The resulting resinous composition which was cut with water to 40 percent solids using 2592 parts H₂O and 430 parts NH₄OH had the following properties:

Solids (percent) _____ 39
Viscosity (Gardner-Holdt) _____ $Z_6$
Solvent _____ H₂O
pH _____ 8.3
Density (wt./gal., lbs.) _____ 8.70
Color (Gardner) _____ 15+

EXAMPLE XII

| | Parts by weight |
|---|---|
| Resinous product of Example XI | 225.0 |
| Water | 315.0 |
| Ammonium hydroxide (28 percent solution) | 2.0 |
| Potassium persulfate | 2.1 |
| Butadiene | 190.0 |
| N-butoxymethyl acrylamide | 20.0 |

The above ingredients were charged into a pressure vessel and held at 78° C. for 16 hours. The resulting resinous composition had the following properties:

Solids (percent) _____ 39.8
pH _____ 8.5
Viscosity (Brookfield viscometer, No. 1 spindle, 30 r.p.m.), cps. _____ 30

When the resinous composition of Example XII is vacuum dried and weight, refluxed and extracted in a Soxhlet extractor with a solvent which would dissolve the the N-butoxymethyl acrylamide-butadiene copolymer or polybutadiene for an extended period, dried and subsequently weighed, there is no loss in weight. This indicates that reaction has taken place between the resinous product of Example XI and the butadiene and N-butoxymethyl acrylamide; it thereby can be presumed that such reaction product is not merely a mixture of the adduct and a copolymer of butadiene and N-butoxymethyl acrylamide, but an integral copolymer.

When other N-alkoxymethyl acrylamides and methacrylamides are substituted for the N-butoxymethyl acrylamide of the above examples, equally good results are obtained. Examples of these other acrylamides include N-methoxymethyl, N-ethoxymethyl and N-propoxymethyl acrylamide, N-methoxymethyl methacrylamides and the higher alcohol derivatives such as the N-pentoxy and the N(2-ethylhexoxymethyl)acrylamides. Moreover, copolymers prepared using ethylenically unsaturated compounds other than butadiene and styrene such as for example the acrylates, particularly methyl methacrylate, methyl acrylate, nitriles such as acrylonitrile and methacrylonitrile and the vinyl esters such as vinyl acetate, vinyl propionate and vinyl butyrate also form reaction products with the adducts. In each and every instance, fumaric acid may be advantageously substituted for maleic acid or maleic anhydride in preparing the adducts of the instant invention.

Although specific examples of the invention have been set forth hereinabove, it is not intended that the invention be limited solely thereto, but to include all of the variations and modifications falling within the scope of the appended claims.

We claim:

1. An aqueous coating composition comprising a water-soluble salt of an interpolymer of:
   (1) from about 5 to about 50 percent, based on the total weight of said interpolymer, of an alpha,beta-ethylenically unsaturated carboxylic acid amide;
   (2) from about 5 to about 30 percent, based on the total weight of said interpolymer, of a mono-ethylenically unsaturated aliphatic carboxylic acid;
   (3) at least one other monomer containing a CH₂=C< group; and
   (4) the salt of an adduct of an unsaturated fatty ester and a member selected from the group consisting of an unsaturated dicarboxylic acid and an unsaturated dicarboxylic anhydride, said salt being formed by the reaction of said adduct with a member of the group consisting of ammonia, amines which form water-soluble salts and quaternary ammonium hydroxides;

said interpolymer being characterized by having amido hydrogen atoms replaced by the structure:

where R is a member of the group consisting of hydrogen and a lower alkyl radical and R₁ is at least one member of the group consisting of hydrogen, lower alkyl and alkoxyethyl radicals, said salt being formed by reacting said interpolymer with a member of the group consisting of ammonia, amines which form water-soluble salts and quaternary ammonium hydroxides, until the pH of said coating compositions is at least about 7.

2. The salt of claim 1 wherein the salt is an amine salt.

3. The salt of claim 1 wherein the interpolymer is an interpolymer of N-butoxymethyl acrylamide, ethyl acrylate, methyl methacrylate and methacrylic acid.

4. The salt of claim 1 wherein the salt is the reaction product of ammonia and an interpolymer of N-butoxymethyl acrylamide, ethyl acrylate, methyl methacrylate and methacrylic acid.

5. The salt of claim 1 wherein the salt is the reaction product of an amine and an interpolymer of N-butoxymethyl acrylamide, ethyl acrylate, methyl methacrylate and methacrylic acid.

6. A method of producing an aqueous coating composition which comprises interpolymerizing a mixture of:
   (1) from about 5 to about 50 percent, based on the total weight of said mixture, of a compound of the formula:

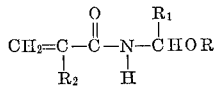

where R is a member of the group consisting of a saturated aliphatic radical having from 1 to 18 carbon atoms and a saturated cycloaliphatic radical having from 3 to 7 carbon atoms, R₁ is a member of the group consisting of hydrogen and a saturated lower aliphatic hydrocarbon radical, and R₂ is a member of the group consisting of hydrogen and a methyl radical;
   (2) from about 5 to about 30 percent, based on the total weight of said mixture, of a mono-ethylenically unsaturated aliphatic carboxylic acid;
   (3) at least one other monomer containing a CH₂=C< group; and
   (4) the salt of an adduct of an unsaturated fatty ester and a member selected from the group consisting of an unsaturated dicarboxylic acid and an unsaturated dicarboxylic anhydride, said salt being formed by the reaction of said adduct with a member of the group consisting of ammonia, amines which form water-soluble salts and quaternary ammonium hydroxides;

the interpolymerization being carried out by adding said mixture simultaneously with an aqueous free radical-initiating catalyst solution to a second aqueous solution of a free radical-initiating catalyst which is maintained under constant agitation at a temperature from about 50° C. to about 95° C., and subsequently reacting the reaction mass with a member of the group consisting of ammonia, amines which form water-soluble salts and quaternary ammonium hydroxides, to a pH of at least about 7.

7. The method of claim 6 wherein the said amide is N-butoxymethyl acrylamide.

8. The method of claim 7 wherein the pH of the reaction mass is adjusted by adding ammonia thereto.

9. The method of claim 7 wherein the said mixture is a mixture of N-butoxymethyl acrylamide, methyl methacrylate, ethyl acrylate and metharcylic acid.

10. An interpolymer comprising a compound represented by the structure

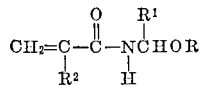

wherein R is a member of the group consisting of a saturated aliphatic radical having from 1 to 18 carbon atoms and a saturated cycloaliphatic radical having from 3 to 7 carbon atoms, $R^1$ is a member of the group consisting of hydrogen and a saturated lower aliphatic hydrocarbon radical and $R^2$ is a member of the group consisting of hydrogen and a methyl radical, at least one other ethylenically unsaturated monomer and the salt of an adduct of an unsaturated fatty ester and a member selected from the group consisting of an ethylenically unsaturated dicarboxylic acid and an alpha,beta-ethylenically unsaturated dicarboxylic acid anhydride, said salt being formed by the reaction of said adduct with a member of the group consisting of ammonia, amines which form water-soluble salts and quaternary ammonium hydroxides.

11. An interpolymer of N-butoxymethyl acrylamide, butadiene and the salt of an adduct of an unsaturated fatty ester and a member selected from the group consisting of an ethylenically unsaturated dicarboxylic acid and an alpha,beta-ethylenically unsaturated dicarboxylic acid anhydride, said salt being formed by the reaction of said adduct with a member of the group consisting of ammonia, amines which form water-soluble salts and quaternary ammonium hydroxides.

12. An interpolymer of N-butoxymethyl acrylamide, styrene and the salt of an adduct of an unsaturated fatty ester and a member selected from the group consisting of an ethylenically unsaturated dicarboxylic acid and an alpha,beta-ethylenically unsaturated dicarboxylic acid anhydride, said salt being formed by the reaction of said adduct with a member of the group consisting of ammonia, amines which form water-soluble salts and quaternary ammonium hydroxides.

13. An interpolymer of N-butoxymethylacrylamide, at least one other ethylenically unsaturated monomer and the salt of an adduct of an unsaturated fatty ester and a member selected from the group consisting of an ethylenically unsaturated dicarboxylic acid and an alpha,beta-ethylenically unsaturated dicarboxylic acid anhydride, said salt being formed by the reaction of said adduct with a member of the group consisting of ammonia, amines which form water-soluble salts and quaternary ammonium hydroxides.

14. An interpolymer of N-butoxymethyl acrylamide, butadiene and an ammonium salt of the adduct of linseed oil and maleic anhydride.

15. An interpolymer of N-butoxymethyl acrylamide, styrene and an ammonium salt of the adduct of linseed oil and maleic anhydride.

16. An interpolymer of N-butoxymethyl acrylamide, butadiene and an ammonium salt of the adduct of a linseed oil-trimethylol ethanephthalic anhydride alkyd resin and maleic anhydride.

17. A method which comprises interpolymerizing a compound represented by the structure:

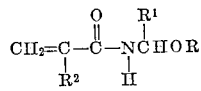

wherein R is a member of the group consisting of a saturated aliphatic radical having from 1 to 18 carbon atoms and a saturated cycloaliphatic radical having from 3 to 7 carbon atoms, $R^1$ is a member of the group consisting of hydrogen, and a saturated lower aliphatic hydrocarbon radical and $R^2$ is a member of the group consisting of hydrogen and a methyl radical, at least one other ethylenically unsaturated monomer and a salt of the adduct of an unsaturated fatty ester and a member selected from the group consisting of an ethylenically unsaturated dicarboxylic acid and an alpha,beta-ethylenically unsaturated dicarboxylic anhydride, said salt being formed by the reaction of said adduct with a member of the group consisting of ammonia, amines which form water-soluble salts and quaternary ammonium hydroxides.

18. The method of claim 17 wherein there is included an amino-alkyl-alkane diol.

19. The method of claim 18 wherein the amino-alkyl-alkane diol is 2-methyl-2-amino-1,3-propanediol.

20. A method which comprises interpolymerizing N-butoxymethyl acrylamide, butadiene and the salt of the adduct of an unsaturated fatty ester and a member selected from the group consisting of an ethylenically unsaturated dicarboxylic acid and an alpha,beta-ethylenically unsaturated dicarboxylic anhydride, said salt being formed by the reaction of said adduct with a member of the group consisting of ammonia, amines which form water-soluble salts and quaternary ammonium hydroxides.

21. A method which comprises interpolymerizing N-butoxymethyl acrylamide, styrene and of the salt of the adduct of an unsaturated fatty ester and a member selected from the group consisting of an ethylenically unsaturated dicarboxylic acid and an alpha,beta-ethylenically unsaturated dicarboxylic anhydride, said salt being formed by the reaction of said adduct with a member of the group consisting of ammonia, amines which form water-soluble salts and quaternary ammonium hydroxides.

22. A method which comprises interpolymerizing a compound represented by the structure:

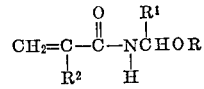

wherein R is a member of the group consisting of a saturated aliphatic radical having from 1 to 18 carbon atoms and a saturated cycloaliphatic radical having from 3 to 7 carbon atoms, $R^1$ is a member of the group consisting of hydrogen and a saturated lower aliphatic hydrocarbon radical and $R^2$ is a member of the group consisting of hydrogen and a methyl radical, at least one other ethylenically unsaturated monomer and a salt of the adduct of an unsaturated fatty ester and a member selected from the group consisting of maleic acid and maleic anhydride and fumaric acid, said salt being formed by the reaction of said adduct with a member of the group consisting of ammonia, amines which form water-soluble salts and quaternary ammonium hydroxides.

23. A method which comprises interpolymerizing N-butoxymethylacrylamide, butadiene and the salt of the adduct of linseed oil and maleic anhydride, said salt being formed by the reaction of said adduct with a member of the group consisting of ammonia, amines which form water-soluble salts and quaternary ammonium hydroxides.

24. A method which comprises interpolymerizing N-butoxymethyl acrylamide, styrene and the salt of the adduct of linseed oil and maleic anhydride, said salt being formed by the reaction of said adduct with a member of the group consisting of ammonia, amines which form water-soluble salts and quaternary ammonium hydroxides.

25. A method which comprises interpolymerizing N-butoxymethyl acrylamide, butadiene and a salt of the adduct of a linseed oil-trimethylolethane-phthalic anhydride alkyd resin and maleic anhydride, said salt being formed by the reaction of said adduct with a member of the group consisting of ammonia, amines which form water-soluble salts and quaternary ammonium hydroxides.

26. An aqueous coating composition comprising a water-soluble salt of an interpolymer of:

(1) from about 5 to about 50 percent, based on the total weight of said interpolymer, of a compound of the formula:

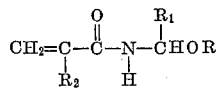

where R is a member of the group consisting of a saturated aliphatic radical having from 1 to 18 carbon atoms and a saturated cycloaliphatic radical having from 3 to 7 carbon atoms, $R_1$ is a member of the group consisting of hyrogen and a saturated lower aliphatic hydrocarbon radical, and $R_2$ is a member of the group consisting of hydrogen and a methyl radical;

(2) from about 5 to about 30 percent, based on the total weight of said interpolymer, of a mono-ethylenically unsaturated aliphatic carboxylic acid;

(3) at least one other monomer containing a $CH_2=C<$ group; and (4) the salt of an adduct of an unsaturated fatty ester and a member selected from the group consisting of an unsaturated dicarboxylic acid and an unsaturated dicarboxylic anyhdride, said salt being formed by the reaction of said adduct with a member of the group consisting of ammonia, amines which form water-soluble salts and quaternary ammonium hydroxides; said salt being formed by reacting said interpolymer with a member of the group consisting of ammonia, amines which form water-soluble salts and quaternary ammonium hydroxides, until the pH of said coating composition is at least about 7.

27. A method of producing an aqueous coating composition which comprises interpolymerizing a mixture of:

(1) from about 5 to about 50 percent, based on the total weight of said mixture, of a compound of the formula:

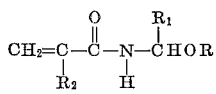

where R is a member of the group consisting of a saturated aliphatic radical having from 1 to 18 carbon atoms and a saturated cycloaliphatic radical having from 3 to 7 carbon atoms, $R_1$ is a member of the group consisting of hydrogen and a saturated lower aliphatic hydrocarbon radical, and $R_2$ is a member of the group consisting of hydrogen and a methyl radical;

(2) from about 5 to about 30 percent, based on the total weight of said mixture, of a mono-ethylenically unsaturated aliphatic carboxylic acid;

(3) at least one other monomer containing a $CH_2=C<$ group; and (4) the salt of an adduct of an unsaturated fatty ester and a member selected from the group consisting of an unsaturated dicarboxylic acid and an unsaturated dicarboxylic anhydride, said salt being formed by the reaction of said adduct with a member of the group consisting of ammonia, amines which form water-soluble salts and quaternary ammonium hydroxides; and said interpolymerization being carried out by adding said mixture and a free radical-initiating catalyst to a water-soluble organic solvent at a temperature of from about 50° C. to about 95° C., and then subsequently mixing the interpolymer solution thus produced with water and a member of the group consisting of ammonia, amines which form water-soluble salts and quaternary ammonium hydroxides, said member being used in an amount sufficient to make the pH of the composition at least about 7.

References Cited by the Examiner
UNITED STATES PATENTS

| | | | |
|---|---|---|---|
| 2,173,005 | 9/1939 | Strain | 260—72 |
| 2,810,713 | 10/1957 | Melamed | 260—80.5 |
| 2,941,968 | 6/1960 | McKenna | 260—26 |
| 3,007,887 | 11/1961 | Essig | 260—72 |
| 3,037,963 | 6/1962 | Christenson | 260—72 |
| 3,079,434 | 2/1963 | Christenson et al. | 260—72 |

FOREIGN PATENTS 467,492   6/1937   Great Britain.

OTHER REFERENCES

Schildknecht: "Vinyl and Related Polymers," p. 321, John Wiley & Sons, N.Y. (1952).

LEON J. BERCOVITZ, *Primary Examiner.*

MILTON STERMAN, *Examiner.*